April 18, 1967     F. V. KOSIKOWSKI     3,314,804
METHOD FOR PACKAGING EGGS
Filed July 24, 1964

INVENTOR.
FRANK V. KOSIKOWSKI
BY *Ralph R. Barnard*
HIS ATTORNEY

United States Patent Office 3,314,804
Patented Apr. 18, 1967

3,314,804
METHOD FOR PACKAGING EGGS
Frank V. Kosikowski, Ithaca, N.Y., assignor to Cornell Research Foundation, Inc., Ithaca, N.Y., a corporation of New York
Filed July 24, 1964, Ser. No. 384,907
4 Claims. (Cl. 99—177)

ABSTRACT OF THE DISCLOSURE

A method of packaging an egg involving the steps of first placing the egg within a pouch of flexible material which is nonpermeable to air; then evacuating the air from within said pouch to a degree representing a substantially high vacuum about 29.5 inches of mercury which will create sufficient forces causing the nonpermeable flexible material to cling to the shell of the egg despite the tendency for oxygen and $CO_2$ to seep through the shell of the egg; and then sealing said pouch to the atmosphere.

---

Figure 1:
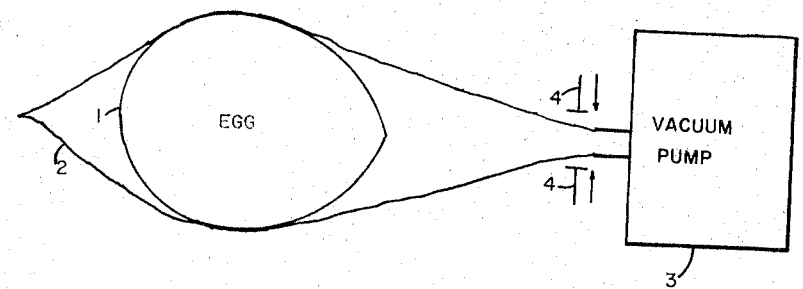

This invention relates generally to the packaging of eggs and more particularly to the packaging of eggs in a manner to extend the keeping qualities of the eggs.

Many eggs are produced, distributed and utilized throughout the world each year. The keeping quality problems associated with the time lag between the production of eggs and their distribution and utilization have been and still are very formidable. More specifically the keeping qualities of eggs may be divided into two categories (1) the eatability characteristics and (2) the fertility and hatchability characteristics. In the past, the keeping qualities of an egg with respect to its fertility and hatchability has been very short. As a practical matter, the keeping qualities of an egg with respect to its eatability (while considerably longer) has also been much too short with regard to an optimum freedom in the distribution and consumption of eggs for food purposes.

Many techniques have been resorted to to extend the keeping qualities of eggs. Of the prior art techniques that have had any measure of success in extending the keeping qualities of eggs, they would all appear to have shortcomings of one or more of the following types:

A. The technique significantly increases the cost of packaging eggs.

B. The technique has no significant capability in extending the fertility or hatchability of the egg and as a matter of fact may reduce it.

C. The technique subjects the eggs to foreign odors which adversely affects their marketability.

D. The technique involves modifying the whole shell egg to an unnatural form (i.e. removing the shell, etc.).

E. The technique involves the addition of $CO_2$ to the egg package in a manner which is time consuming, expensive and adverse to egg quality and hatchability, and corrosive to equipment.

F. The technique results in mold formation within the package after a relatively short storage period.

Of the prior art, perhaps the most pertinent to the teachings of the present invention to be described hereinafter are those set forth in an article entitled "Effect of Oiling, Package Materials and Addition of $CO_2$ on the Quality of Shell Eggs Held in Storage" by D. A. Fletcher et al., Poultry Science vol. 38, p. 106, 1959, and an article entitled "A Further Study on the Use of Plastic Film Bags for Egg Storage," by H. L. Orr et al., Poultry Science, vol. 38, p. 736, 1959. The second article is a continuation study of the first. In the first article Fletcher et al. reported on his experimental work with packaging hens' eggs in Cryovac vinylidene chloride copolymer bags under an unspecified vacuum and found no difference in the keeping quality of the shell eggs stored in vacuumed or non-vacuumed bags (he also included in his experimental work eggs the shells of which had been oiled according to another prior art technique). In the second article, Orr et al. confirmed the results of the Fletcher et al. article and also observed that the vacuumed packed eggs in plastic film bags molded after three months of storage at 30 degrees Fahrenheit.

The conclusions reached in the studies reported in these two articles included the finding that the packaging in plastic film bags (with or without any vacuum packing) resulted in a keeping quality for eggs with respect to their eatability equalled that of the prior art oiling technique without the adverse effect of an oil odor. However, there was a firm conclusion that the results observed from the use of a vacuum in the plastic film packaging did not differ from the results observed for plastic film packaging without a vacuum. The keeping quality of the eggs for fertility and hatchability was not considered. Cryovac packaging is well known to the present applicant. It involves the use of equipment manufactured by Cryovac Division of W. R. Grace and Company of Cambridge, Mass., and it depends upon a vacumu unit which is factory set for standard model machines at about 15 inches of partial vacuum.

Prior to the teachings of the present invention, it was widely thought that the fertility and hatchability of the egg disappeared very quickly with time and particularly so when the temperature of the storage was down in the range near chilling and/or freezing.

In view of the foregoing, the state of knowledge on the packaging and storing of eggs with respect to the keeping qualities of (1) eatability and (2) fertility and hatchability were such that a substantial improvement in this technical area would have far reaching economic, technical and public health significance to the distribution and marketing of eggs for either of the two purposes.

One of the problems in packaging eggs not heretofore mentioned is the importance of insuring that the eggs reach the consumer without cracks in their shell. Cracks in eggs are significant because they provide for microbial entry within the egg during storage and ultimately, following growth, may cause a condition which adversely affects the egg as to eatability and safety. For example, such microorganisms may result in a diseases known as Salmonella food poisoning. Even the most minute crack not easily recognizable by the human eye is a potential passage for such bacteria. For additional background with respect to this problem, reference should be had to an article entitled, "Salmonella Derby," by E. Sanders, Journal of the American Medical Association, vol. 186:984, 1963. In summary, the easy observance and the culling out of cracked eggs is a very important step in an effective egg packaging operation.

Accordingly, it is therefore a primary object of the teachings of the present invention to provide a new and improved package and method for the packaging of an egg in a manner to extend the keeping qualities and safety of that egg.

It is another object of the teachings of the present invention to provide a new and improved package and method for packaging an egg to extend its keeping qualities in a manner which is of low cost.

It is an additional object of the teachings of the present invention to provide a new and improved package and method for packaging an egg to extend its keeping qualities in a manner which is not time consuming or corrosive to the packaging equipment.

It is still another object of the teachings of the present invention to provide a new and improved package and method of packaging an egg to extend its keeping qualities as to eatability and safety.

It is another object of the teachings of the present invention to provide a new and improved package and method of packaging an egg which will extend the keeping qualities of the egg with respect to its fertility and hatchability.

It is still another object of the teachings of the present invention to provide a new and improved method for packaging eggs which inherently tests each egg for cracks thereby culling those eggs which will be subject to bacteria attacks during storage leading to health problems such as food poisoning known as Salmonella.

It is an additional object of the teachings of the present invention to provide a new and improved method of packaging an egg so as to extend its keeping quality without including as a step the removal of its shell or further modification of the egg from its natural form.

Briefly, these and other objects of the teachings of the present invention are accomplished by packaging an egg by placing the egg in a substantially high vacuum environment. Specifically, the egg to be packaged is placed in a pouch or bag of flexible material where said material is relatively non-permeable to air. The pouch or bag of flexible material is then attached to a vacuum apparatus which is capable of producing the substantially high vacuum within the flexible material so that the flexible material is stressed into close hugging relationship with the egg. The flexible material is then sealed to the atmosphere. The rapidity with which the substantial vacuum within the flexible non-permeable material can be obtained is very important to the keeping qualities of the egg.

Figure 2:
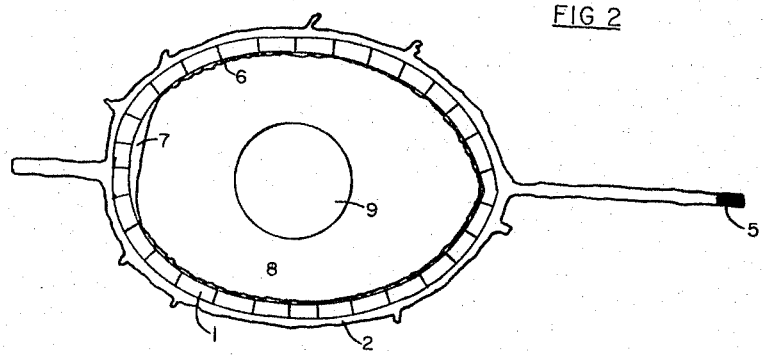

Other objects of the present invention will be apparent to those skilled in the art upon study of the accompanying disclosure and drawings in which:

FIGURE 1 depicts the application of a substantially high vacuum packaging to an egg in accordance with the teachings of the present invention, and FIGURE 2 shows an egg packaged in accordance with the teachings of the present invention.

The essence of the teachings of the present invention may be stated most concisely using the experimental work of Fletcher et al. and Orr et al. identified hereinabove as a point of reference. Their conclusion was, that while the keeping qualities of an egg were improved slightly when it was packaged in a plastic-film bag, no significant improvement was noted when the air within the bag was evacuated than when it was not. This was undoubtedly the result of the fact that the standard Cryovac machine used by them evacuated the air from the space between the egg and the bag only to a degree measuring a partial vacuum not to a degree of a substantially high vacuum as suggested by the teachings of the present invention. A contributing factor may have also been that the vinylidene chloride copolymer bags used by Orr et al. were not sufficiently non-permeable to air or not properly sealed. Fletcher et al. and Orr et al. reported that eggs stored in the plastic film bags with and without the air evacuated from the bag extended the keeping qualities of the eggs as to eatability for a period of about six to seven months. They did not report any study of the keeping qualities of the eggs packaged within a plastic film bag as to fertility and hatchability.

The keeping qualities of eggs as to fertility and hatchability was reported in an article by Roy H. Waite entitled "The Effect of Age of Eggs on Their Hatching Quality," Maryland Agriculture Experimental Station Bulletin 233:8701, 1919. Therein he stated that the fertility and hatchability of eggs in storage dropped off rapidly after the first week and of a sample lot of 56 eggs stored for 28 days prior to incubation only 3 chicks were hatched. Until the teachings of the present invention it has been the general consensus of those skilled in the art that the storage of hatching eggs should be at a temperature of substantially above freezing (i.e. around 50 degrees Fahrenheit, but not around 40 degrees Fahrenheit).

Turning again to the teachings of the present invention reference should be made to FIGURE 1. Therein an egg 1 is placed within a pouch bag or similar encapsulation container 2 which is made of a highly flexible material especially selected to be non-permeable to air. The mouth of the encapsulation container 2 is then operably connected to a high vacuum pump 3 in a conventional manner. The vacuum pump 3 which is especially selected as one having the capacity to then evacuate the air within the flexible encapsulation container 2 to a degree measuring a substantially high vacuum.

As a result of this evacuation of air the flexible material 2 is stressed into close hugging relationship with egg 1 as shown in FIGURE 2. After the air evacuation step, the mouth of the flexible encapsulation container 2 is then sealed by conventional means shown here as movable heatable bars 4. The method by which the sealing takes place forms no part of the present invention and the only requirement is that the sealing be effective to prevent passage of air into the flexible bag or pouch type encapsulation container 2 which is in hugging relationship with the egg 1.

FIGURE 2 shows the egg in a close hugging relationship as packaged, detached from the vacuum pump 3 and sealed at position 5. Identification numeral 1 also represents the outer shell of the egg. Identification numerals 6, 7, 8 and 9 represent the egg membrane, typical air cell, egg albumen and yolk, respectively.

The essence of the present invention is that the substantially high vacuum creates strong forces which causes the non-permeable material to cling to the shell of the egg and effectively give it a non-permeable coating which will not allow $CO_2$ and oxygen to pass through the porous shell as would normally happen as an egg ages. Accordingly, a substantially high vacuum, as used in describing the teachings of the present invention, is that degree of vacuum which will create sufficient forces causing the non-permeable flexible material to cling to the shell of the egg despite the tendency for the oxygen and $CO_2$ to seep through the shell. It may be generally stated that the higher the vacuum used the better the results from the teachings of the present invention. As an example, a vacuum of 750 mm. mercury (or 29.5 inches) gives excellent results.

It may also be stated that the results from the teachings of the present invention are also improved by increases in the non-permeability of the flexible material. An example of a type of bag which is both sufficiently non-permeable and flexible is one which is double layered or laminated with cellophane and polyethylene. To the degree that it does not adversely affect critical flexibility, metal foil may be included.

It is also important to the teachings of the present invention that evacuation of air to a degree measuring a substantially high vacuum be done quickly otherwise oxygen and $CO_2$ will be withdrawn from within the egg through the shell during the process.

When eggs are packaged in accordance with the teachings of the present invention and stored in a standard refrigeration environment (temperature range about 35 to 50 degrees Fahrenheit and relative humidity range of 85 to 90 percent) significant improvement occurs as to their keeping qualities. A grade A egg will retain its grading as to eatability for a period which exceeds 23 months. A fertile egg has a high probability of retaining its fertility for insertion into an incubator for a period which is in excess of 34 days. As an example of the probabilities, if 5 eggs were packaged as described hereinabove in connection with FIGURES 1 and 2, and stored at about 40 degrees Fahrenheit at approximately 87 percent relative humidity, those eggs could be incubated on the 34th day with a yield of 4 fertile eggs and with 3 of these fertile eggs hatching out chicks.

The quality of eggs packaged in accordance with the teachings of the present invention have been tested by many techniques. For example, the eggs maintain high Haugh unit value throughout the storage period. The eggs maintained a constant pH value in both the albumen and the yolk throughout the storage period. X-ray analysis showed no increase in air cell size during the storage period. The eggs do not experience a significant loss of weight during the storage period. The eggs do not mold during the storage period. All of these factors support the significance of the teachings of the present invention.

Another very important feature of the present invention results from the forces which an egg withstands when it is subjected to a substantially high vacuum during the packaging process. An egg even with the most minute crack will break, completely or partially, during the process. Accordingly, the packaging of eggs using the teachings of the present invention in effect is inherently functioning to select only those eggs which do not contain cracks. The eggs which are broken can of course be salvaged for a useful food purpose.

The importance of this feature emphasizes that even the smallest crack is a potential passage for bacteria which may contaminate the egg and result in food poisoning to the human consumer. One type of food poisoning which may result is Salmonella derby which is reported on in the Journal of the American Medical Association article identified hereinabove. Therein, 1050 cases of food poisoning by Salmonella derby were reported to have occurred in U.S. hospitals from Mar. 1, 1963, to Aug. 14, 1963. As a result, the Surgeon General of the U.S. Public Health Services recommended that only hard boiled eggs be consumed by patients in hospitals.

One benefit resulting from the teachings of the present invention is that eggs originally packaged for purposes of hatchability can be stored at temperatures which preserve eatability also. Accordingly, if the period which fertility is maintained is exceeded, the eggs may then be sold for food purposes.

While the invention has been particularly shown and described with reference to preferred embodiments thereof, it will be understood by those skilled in the art that the foregoing and other changes in form and details may be made therein without departing from the spirit and scope of the invention.

What is claimed is:

1. The method of packaging an egg comprising placing an egg within an encapsulation of flexible material which is non-permeable to air, evacuating the air from said encapsulation to a degree representing a substantially high vacuum about 29.5 inches of mercury which will create sufficient forces causing said nonpermeable flexible material to cling to the shell of said egg despite the tendency for oxygen and $CO_2$ to seep through the shell of said egg, and then sealing said encapsulation to the atmosphere.

2. The method of packaging an egg comprising placing an egg in a pouch of flexible material which is non-permeable to air, quickly evacuating the air from said pouch to a degree amounting to a substantially high vacuum about 29.5 inches of mercury which will create sufficient forces causing said non-permeable flexible material to cling to the shell of said egg despite the tendency for oxygen and $CO_2$ to seep through the shell of said egg, and then sealing said pouch to the atmosphere.

3. The method of packaging an egg comprising placing an egg in a pouch of flexible material which is non-permeable to air, quickly evacuating the air from said pouch to a degree measuring a substantially high vacuum about 29.5 inches of mercury which will create sufficient forces causing said nonpermeable flexible material to cling to the shell of said egg despite the tendency for oxygen and $CO_2$ to seep through the shell of said egg, and then sealing said pouch to the atmosphere, said quick evacuation of the air from said pouch to the degree of a substantial vacuum functioning to cause shell breakage of egg if the shell initially contained cracks in a manner such that the packaging method functions to test eggs for shell cracks.

4. The method of packaging an egg comprising placing an egg in a pouch of flexible material which is non-permeable to air, quickly evacuating the air from said pouch to a degree measuring a substantial vacuum about 29.5 inches of mercury which will create sufficient forces causing said nonpermeable flexible material to cling to the shell of said egg despite the tendency for oxygen and $CO_2$ to seep through the shell of said egg, and then sealing said pouch to the atmosphere, said hugging flexible material forming an encapsulation of the egg so as to extend its characteristics as to keeping qualities.

References Cited by the Examiner

Fletcher, D. A., et al., Poultry Science, 38, 106–111 (1959).

Chemical and Engineering News, Nov. 28, 1955, p. 5226.

Reid, R. G., Poultry Tribune, March 1961, p. 12.

A. LOUIS MONACELL, *Primary Examiner.*

L. M. SHAPIRO, *Assistant Examiner.*